US007808889B1

(12) United States Patent
Howard

(10) Patent No.: US 7,808,889 B1
(45) Date of Patent: Oct. 5, 2010

(54) SILENT FAILOVER FROM A PRIMARY CONTROL UNIT TO A BACKUP CONTROL UNIT OF A NETWORK DEVICE

(75) Inventor: Paul Howard, Windham, NH (US)

(73) Assignee: Juniper Networks, Inc., Sunnyvale, CA (US)

( * ) Notice: Subject to any disclaimer, the term of this patent is extended or adjusted under 35 U.S.C. 154(b) by 1715 days.

(21) Appl. No.: 10/997,470

(22) Filed: Nov. 24, 2004

(51) Int. Cl.
*G06F 11/00* (2006.01)
(52) U.S. Cl. .......................... 370/217; 370/220; 726/2; 726/27
(58) Field of Classification Search ......... 370/216–221, 370/224; 726/2, 17, 27; 709/223–225; 714/47
See application file for complete search history.

(56) References Cited

U.S. PATENT DOCUMENTS

| 6,553,568 | B1 * | 4/2003 | Fijolek et al. ............... 725/111 |
| 6,563,793 | B1 * | 5/2003 | Golden et al. ............... 370/236 |
| 6,574,709 | B1 * | 6/2003 | Skazinski et al. ........... 711/119 |
| 6,732,314 | B1 * | 5/2004 | Borella et al. ............... 714/752 |
| 6,778,491 | B1 * | 8/2004 | Fourcand et al. ............ 370/217 |
| 6,910,148 | B1 * | 6/2005 | Ho et al. ........................ 714/4 |
| 6,912,197 | B2 * | 6/2005 | Mahamuni .................. 370/219 |
| 7,155,740 | B2 * | 12/2006 | Brustoloni ................... 726/15 |
| 7,451,209 | B1 * | 11/2008 | Schieber et al. ............. 709/224 |
| 2003/0088698 | A1 * | 5/2003 | Singh et al. .................. 709/239 |
| 2003/0212927 | A1 * | 11/2003 | Navar et al. .................... 714/47 |
| 2005/0262298 | A1 * | 11/2005 | Lubbers et al. ............. 711/112 |
| 2006/0168241 | A1 * | 7/2006 | Puthiyandyil et al. ....... 709/227 |

OTHER PUBLICATIONS

Paul Howard et al, Fail Over extensions for L2TP "failover", draft-ietf-12tpext-failover-04.txt, 16 pages, (Sep. 2004).
W. Townsley et al., Layer Two Tunneling Protocol "L2TP", rfc2661.txt, 72 pages, (Aug. 1999).

* cited by examiner

*Primary Examiner*—William Trost, IV
*Assistant Examiner*—Roberta A Shand
(74) *Attorney, Agent, or Firm*—Shumaker & Sieffert, P.A.

(57) ABSTRACT

A network device includes a primary control unit that establishes a network tunnel with another network device. The network device applies a silent failover technique to failover from the primary control unit to a backup control unit while maintaining the network tunnel. The network tunnel may be, for example, a Layer 2 Tunneling Protocol (L2TP) tunnel, and the network device may be an L2TP Access Concentrator (LAC) or an L2TP Network Server (LNS). The techniques may prevent abnormal termination of the network tunnel during the failover. Once the failover from the primary control unit to the backup control unit is complete, the backup control unit synchronizes sequence numbers associated with the network tunnel with sequence numbers of the non-failed network device, and resolves inconsistencies between subscriber session databases of the backup control unit and the non-failed network device.

39 Claims, 5 Drawing Sheets

SILENT FAILOVER FROM A PRIMARY CONTROL UNIT TO A BACKUP CONTROL UNIT OF A NETWORK DEVICE

TECHNICAL FIELD

The invention relates to computing networks and, more particularly, to failover techniques for network routers.

BACKGROUND

The Point-to-Point protocol (PPP) is a network communication protocol specifically designed for connecting a device to a network, such as the Internet. In particular, a subscriber device, such as a home computer, a portable digital assistant (PDA), or other device, may utilize PPP to communicate with an Internet Service Provider (ISP) that provides access to the Internet or another network. PPP operates within the data link layer of the OSI model and, therefore, is referred to as a layer two protocol.

The Layer Two Tunneling Protocol (L2TP) defines a general-purpose mechanism for tunneling network packets conforming to PPP over various media. Specifically, L2TP defines a mechanism by which packets conforming to the PPP protocol are encapsulated within L2TP frames.

In a typical configuration, the subscriber device communicates with an L2TP Access Concentrator (LAC). The LAC is a device attached to the switched network access fabric, e.g., Public Switched Telephone Network (PSTN) or Digital Subscriber Line (DSL) network, or otherwise co-located with a PPP end system capable of handling the L2TP protocol. The LAC receives the PPP packets from the subscriber device, and passes the PPP packets to an L2TP Network Server (LNS) via an L2TP tunnel. The LNS, referred to generally as a "tunnel termination device," is a layer three device that provides a termination point for the L2TP tunnel. More specifically, the LNS extracts the PPP packets encapsulated via the L2TP, and introduces the packets to the Internet or other network. Consequently, each L2TP tunnel is defined by an LNS-LAC pair in which the LNS and the LAC terminate opposite ends of the tunnel. Moreover, the LNS may be viewed as the "server-side" of the L2TP tunnel. Each L2TP session terminated by the LNS is referred to as a "subscriber session." Each L2TP tunnel may include several subscriber sessions.

A typical ISP may have multiple LNSs to provide network access for subscriber devices. Upon receiving a network access request from one of the subscriber devices, the LAC typically selects one of the LNSs, and attempts to establish an L2TP tunnel with the selected one of the LNSs. If the attempt fails, the LAC selects a different one of the LNSs and repeats the process. This process continues until either an L2TP tunnel is established and a subscriber session has been established or all of the available LNSs have been tried.

SUMMARY

In general, the invention is directed to techniques for performing a silent failover of a primary control unit associated with a network device. The silent failover may be performed entirely within the failed device without knowledge or explicit support of a peer, non-failed device. In this way, only the failed device need implement the silent failover techniques. For example, the failed device may comprise a Layer 2 Tunneling Protocol (L2TP) Access Concentrator (LAC) and the peer device may comprise an L2TP Network Server (LNS). In that case, the LAC may be recovered by the silent failover techniques described herein without notifying the LNS of the failover. In other cases, the failed device may comprise an LNS and the peer device may comprise a LAC. The LAC and the LNS are connected by at least one L2TP tunnel, which may include several subscriber sessions.

The failed device prevents termination of the L2TP tunnel between the non-failed device and the failed device during the failover. For example, when a failover occurs, data packets may be en-route between the non-failed device and the failed device. The silent failover techniques allow the failed device to handle the en-route packets without knowledge of the contents of the packets and without forcing termination of the L2TP tunnel. Once the failover is complete, the failed device synchronizes sequence numbers of the failed device with sequence numbers of the non-failed device and resolves inconsistencies between the subscriber session databases of the failed device and the non-failed device.

In certain embodiments, the LAC, the LNS, or both may implement the silent failover techniques described herein. Moreover, the LAC, the LNS, or both may further comprise routing functionality, as described herein. For example, an edge router operating as a LAC or an LNS may utilize the techniques to silently failover when a primary routing engine fails, thereby avoiding termination of one or more L2TP tunnels.

In one embodiment, a method comprises establishing a network tunnel between a first device and a second device, wherein the first device includes a primary control unit and a backup control unit. The method also comprises failing over to the backup control unit in response to a failure of the primary control unit and maintaining the network tunnel throughout the failover.

In another embodiment, a first network device comprises a primary control unit that establishes a network tunnel with a second network device, and a backup control unit that maintains the network tunnel in response to a failure of the primary control unit.

In a further embodiment, a method comprises receiving, with an interface of a network device, a failover notification indicating initiation of a failover of a primary control unit of the network device to a backup control unit. The method also comprises redirecting packets received by a forwarding controller of the interface to an interface controller in response to the failover notification.

In an additional embodiment, a network device comprises a primary control unit, a backup control unit, and an interface having an interface controller and a forwarding controller. The backup control unit issues a failover notification when the network device initiates a failover of the primary control unit to the backup control unit. The forwarding controller directs control plane packets to the primary control unit prior to the failover notification, and directs control plane packets to the interface controller in response to the failover notification.

In another embodiment, a method comprises mirroring sequence numbers from a primary control unit to a backup control unit of a network device. The method further comprises synchronizing sequence numbers associated with a network communication protocol executed by the backup control unit based on the mirrored sequence numbers from the primary control unit upon failure of the primary control unit.

In a further embodiment, a network device comprises a primary control unit and a backup control unit. The primary control unit includes a mirroring module to mirror sequence numbers associated with a network communication protocol executing on the primary control unit. The backup control unit includes a mirrored database to store the mirrored sequence numbers.

In another embodiment, a method comprises receiving inbound packets during a failover of a primary control unit to a backup control unit of a network device. The method also comprises maintaining a network tunnel previously established by the primary control unit by automatically acknowledging receipt of any of the packets that are control plane packets associated with the network tunnel.

In an additional embodiment, a network device comprises an interface and a response module. The interface receives packets during a failover of a primary control unit to a backup control unit. The response module acknowledges receipt of any of the packets that are control plane packets associated with a network tunnel to maintain the network tunnel during the failover.

In a further embodiment, the method comprises sending a duplicate control plane packet from a backup control unit of a first network device upon failover from a primary control unit to the backup control unit. The method also comprises receiving an acknowledgment from a second network device, wherein the acknowledgment includes sequence numbers, and synchronizing sequence numbers at the backup control unit to sequence numbers at the second network device based on the sequence numbers specified within the acknowledgement to the duplicate packet.

In another embodiment, a first network device comprises a primary control unit, a backup control unit, and a sequence number synchronization module. The sequence number synchronization module sends a duplicate control plane packet upon failover from the primary control unit to the backup control unit, and synchronizes sequence numbers at the backup control unit to sequence numbers at a second network device based on an acknowledgement to the duplicate packet.

In a further embodiment, a method comprises accessing a subscriber database of a backup control unit to identify subscriber sessions associated with a network tunnel upon failover to the backup control unit from a primary control unit. The method also comprises monitoring for data packets on the identified subscriber sessions for a time interval. The method further comprises terminating any of the subscriber sessions for which no data packets were received during the time interval, and updating the subscriber database within the backup control unit to remove the terminated subscriber sessions. The method also includes detecting data packets associated with a subscriber session not specified within the subscriber database, and terminating the subscriber session with the backup control unit in response to the detected packets.

In an additional embodiment, a network device comprises a primary control unit, a backup control unit having a subscriber database, and a database synchronization module. The database synchronization module accesses the subscriber database to identify subscriber sessions associated with a network tunnel upon failover to the backup control unit from the primary control unit, terminates any of the subscriber session for which no data packets are received during a time interval, updates the subscriber database within the backup control unit to remove the terminated subscriber sessions, detects data packets associated with a subscriber session not specified within the subscriber database, and terminates the subscriber session with the backup control unit in response to the detected packets.

Other embodiments include computer-readable media comprising instructions for causing programmable processors to carry out the methods described herein. The details of one or more embodiments of the invention are set forth in the accompanying drawings and the description below. Other features, objects, and advantages of the invention will be apparent from the description and drawings, and from the claims.

DETAILED DESCRIPTION

Figure 1:
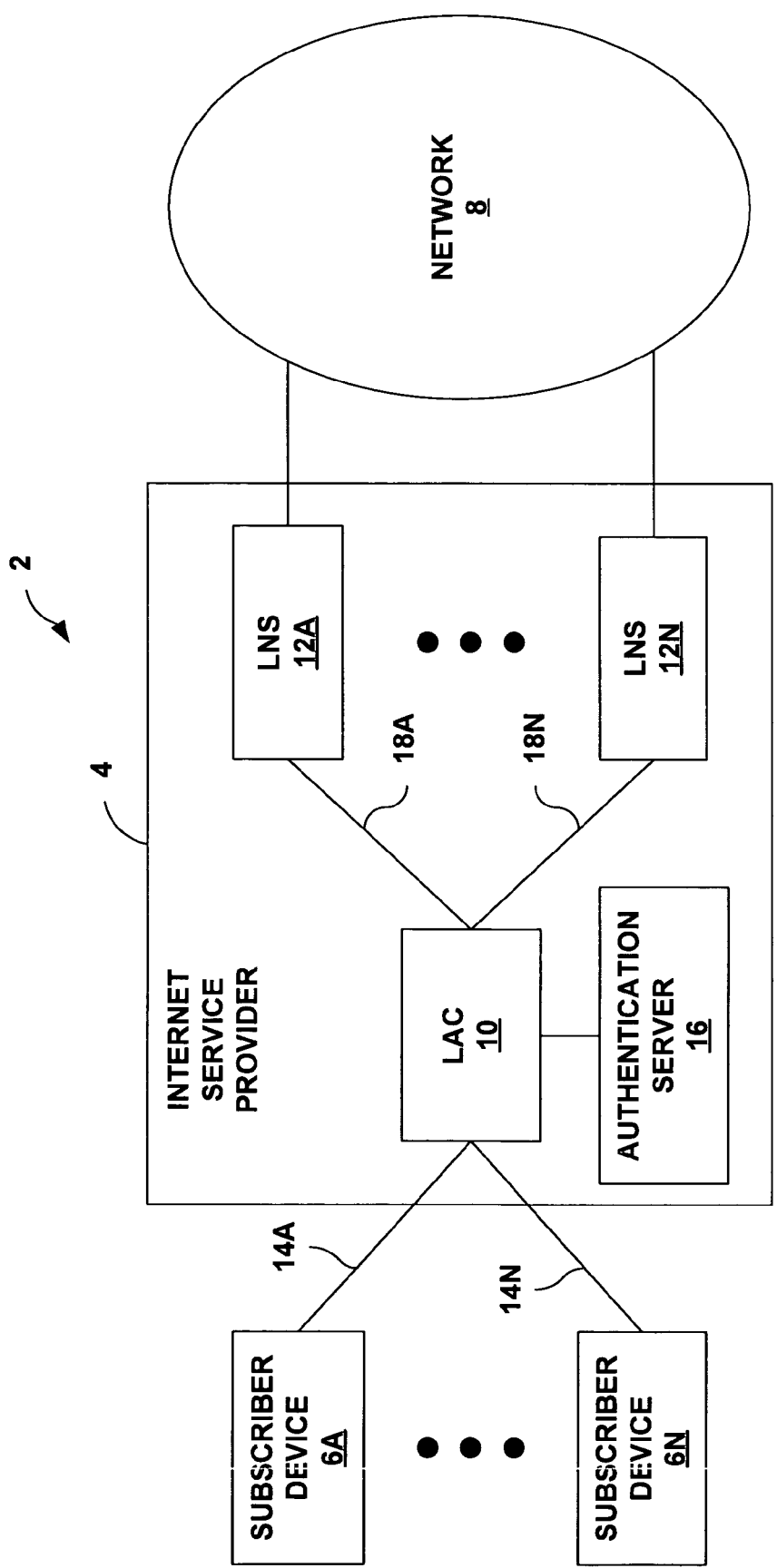
FIG. 1 is a block diagram illustrating an exemplary system in which an Internet Service Provider (ISP) provides subscriber devices with connectivity to a network.

FIG. 1 is a block diagram illustrating an exemplary system 2 in which an Internet Service Provider (ISP) 4 provides subscriber devices 6A-6N ("subscriber devices 6") with connectivity to a network 8. Network 8 represents any computer network, and may have a variety of networked resources capable of data communication. For example, network 8 may include routers, hubs, gateways, servers, workstations, network printers and faxes, and the like. Moreover, network 8 may be the Internet or any public or private network.

As illustrated, ISP 4 includes a Layer 2 Tunneling Protocol (L2TP) Access Concentrator (LAC) 10 and a plurality of L2TP Network Servers 12A-12N ("LNSs 12"). In general, LAC 10 or any of LNSs 12 may have multiple control units, i.e., a primary control unit and one or more backup control units. Upon failure of the primary control unit, one of the backup control units of the failed device takes over operation as the primary control unit, and performs the silent failover techniques described herein. Moreover, the backup control unit may perform the techniques without requiring knowledge or explicit support of the peer, non-failed device. As an example, the failed device may comprise LAC 10 and the non-failed peer device may comprise one of LNSs 12. In this way, only LAC 10 needs to be compatible with the silent failover techniques. In other embodiments, the failed device may comprise one of LNSs 12 and the non-failed device may comprise LAC 10.

In the illustrated embodiment, each of subscriber devices 6 utilizes the Point-to-Point protocol (PPP) 14 to communicate with LAC 10. Specifically, using PPP 14, one of subscriber devices 6 requests access to network 8, and provides user information, such as a username and password. Each of subscriber devices 6 may be, for example, a home computer, a portable digital assistant (PDA), a mobile phone, or other network-enabled device. PPP 14 may be supported on digital subscriber lines (DSLs) that connect subscriber devices 6 with LAC 10. In other embodiments, subscriber devices 6 may utilize a non-PPP protocol to communicate with LAC 10.

LAC 10 authenticates the user information. LAC 10 may, for example, internally authenticate the user information, or may forward the user information to authentication server 16. Upon authenticating the user information, LAC 10 selects one of LNSs 12 and attempts to establish an L2TP tunnel 18 with the selected one of LNSs 12. For example, LAC 10 may select LNS 12A and attempt to establish an L2TP tunnel 18A. LAC 10 may establish a plurality of subscriber sessions with LNS 12A on L2TP tunnel 18A.

Once LAC 10 has established the subscriber session, e.g., by establishing one of L2TP tunnels 18, the LAC passes PPP packets received from subscriber device 6 to the one of LNSs 12 that is operating as the tunnel termination device. For purposes of example, assume that LAC 10 has successfully established L2TP tunnel 18A with LNS 12A. In this case, LAC 10 receives the PPP packets via PPP protocol 14, and passes the PPP packets to LNS 12A via L2TP tunnel 18A. LNS 12A extracts the PPP packets encapsulated within L2TP tunnel 18A, and introduces the PPP packets to network 8.

The silent failover techniques described herein allow LAC 10 to prevent abnormal termination of L2TP tunnel 18A during the failover. As a result, the multiple sessions that may be associated with L2TP tunnel 18A need not be torn down and reestablished. When LAC 10 initiates a failover from a failed primary control unit to a backup control unit, for example, control packets may be en-route on L2TP tunnel 18A for one or more of the subscriber sessions established between LAC 10 and LNS 12A. The silent failover techniques allow LAC 10 to handle the en-route packets during the failover without terminating L2TP tunnel 18A even though LAC 10 may not have knowledge of the packets or the contents of the packets. For example, once the failover is complete, the backup control unit of LAC 10 synchronizes sequence numbers of LAC 10 with sequence numbers of LNS 12A and resolves inconsistencies between the subscriber session databases of LAC 10 and LNS 12A.

Although the techniques are described for exemplary purposes in reference to L2TP, the techniques may readily be applied to other communication protocols that utilize reliable sequence numbering. Moreover, the techniques may be applied to a variety of network devices, access devices, enterprise devices, edge devices or core devices. Further, the devices may implement layer two functionality, layer three functionality or combinations thereof. For exemplary purposes, the techniques are further described in reference to a network router that may support L2TP and may operate as either a LAC or LNS.

Figure 2:
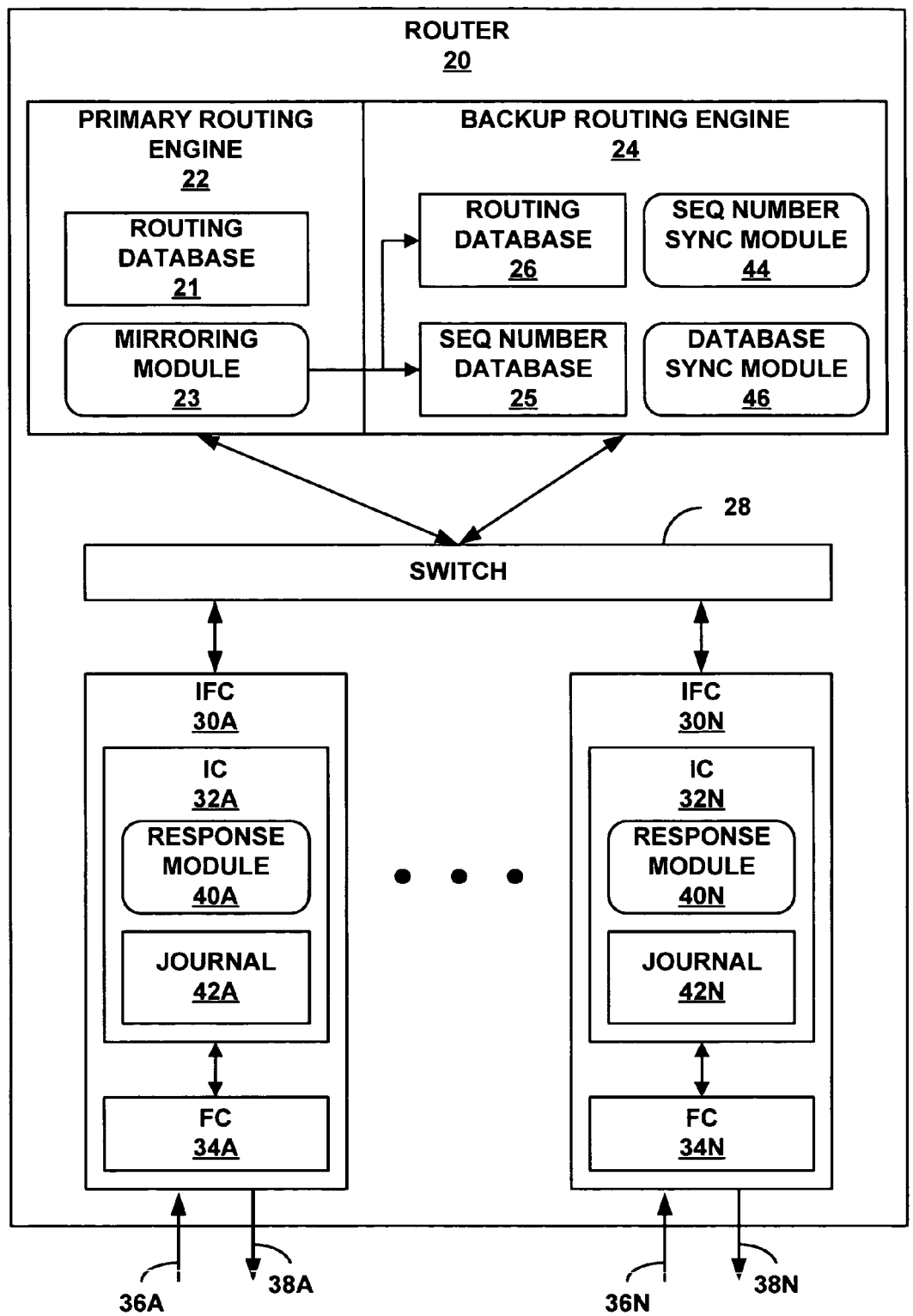
FIG. 2 is a block diagram illustrating an exemplary router capable of performing a silent failover consistent with the principles of the invention.

FIG. 2 is a block diagram illustrating an exemplary router 20 capable of performing a silent failover consistent with the principles of the invention. Router 20 may be substantially similar to LAC 10 or one of LNSs 12 from FIG. 1. Router 20 may establish a network tunnel with another peer device (not shown in FIG. 2). The network tunnel may, for example, be an L2TP tunnel having a plurality of subscriber sessions. Router 20 may perform the silent failover without knowledge by or explicit support from the peer device. In this way, only router 20 need be compatible with the silent failover techniques.

In the illustrated embodiment, router 20 includes a primary routing engine 22 and a backup routing engine 24. In this manner, router 20 may be viewed as having a primary control unit and a backup control unit. Primary routing engine 22 is responsible for maintaining routing database 21 to reflect the current topology of a network and other network entities to which router 20 is connected. Router 20 also includes interface cards (IFCs) 30A-30N ("IFCs 30") that receive packets on inbound links 36A-36N ("inbound links 36") and send packets on outbound links 38A-38N ("outbound links 38"). IFCs 30 are coupled to primary routing engine 22 and backup routing engine 24 via a high-speed switch 28.

Each of IFCs 30 includes an interface controller (IC) and a forwarding controller (FC). When FCs 34 receive control plane packets from other routers on inbound links 36, ICs 32 direct FCs 34 to send the control plane packets to primary routing engine 22 via switch 28. Primary routing engine 22 updates routing database 21 based on the control plane packets. Primary routing engine 22 acknowledges receipt of the control plane packets by sending acknowledgement messages to the other routers via FCs 34 and outbound links 38. In other embodiments, interface controllers and forwarding controllers may not be located within IFCs. Furthermore, the techniques described herein may apply to any network device with separate data plane and control plane processing.

Primary routing engine 22 includes a mirroring module 23 to mirror the control plane traffic and direct the mirrored packets to backup routing engine 24 for storage in a routing database 26. In that way, both primary routing engine 22 and backup routing engine 24 have substantially similar routing information. Mirroring module 23 may also periodically mirror sequence numbers related to the control plane packets at primary routing engine 22. Mirroring module 23 may then store the mirrored sequence numbers in a sequence number database 25 within backup routing engine 24.

The sequence numbers may be associated with a network tunnel, such as an L2TP tunnel, between router 20 and another peer device (not shown). Router 20 and the peer device may utilize reliable sequence numbers when communicating via the tunnel Exemplary operation of control packet sequence numbers is explained in informational request for comment (RFC) 2661 entitled "Layer Two Tunneling Protocol 'L2TP'," copyright August 1999, from the Internet Engineering Task Force (IETF), herein incorporated by reference. The sequence numbers maintained by router 20 may include a sequence number of the next packet to be sent and a sequence number of the next packet expected to be received for the network tunnel. In some embodiments, mirroring module 23 may define a mirroring period based on a number of sequence number changes. For example, mirroring module 23 may mirror the sequence numbers to backup routing engine 24 at approximately 256 sequence number changes. In other embodiments, mirroring module 23 may change the mirroring period to balance the storage cost of mirroring the sequence numbers with the benefit of recording a substantially current set of sequence numbers.

When router 20 sends packets to the other router on the network tunnel, an acknowledgement of receipt is expected from the other router. Furthermore, when router 20 receives packets from the other router on the network tunnel, the other router expects an acknowledgement of receipt as well. If either router does not receive an acknowledgement message in response to a sent packet, which may occur in conventional systems upon failure of a primary control unit, the entire network tunnel including all the subscriber sessions established within the tunnel may be lost. In some embodiments, the routers have a maximum of approximately 30 seconds to acknowledge a control plane packet before termination of the tunnel. As further described, the silent failover techniques employed by router 20 may ensure proper acknowledgement of received packets to prevent the termination of the network tunnel and the associated subscriber sessions.

Moreover, the silent failover techniques employed by router 20 may prevent the termination of the network tunnel and the associated subscriber sessions in certain situations even when packets are lost. As one example, primary routing engine 22 may hold received control plane packets in a queue before processing the packets. Once the packets are processed, primary routing engine 22 sends the corresponding acknowledgment messages and mirrors the control plane packets to backup routing engine 24. Because packet processing may not occur immediately upon receipt, a time lag may arise between routing database 21 at primary routing engine 22 and routing database 26 at backup routing engine 24. When router 20 initiates a failover of primary routing engine 22, backup routing engine 24 may take over the routing responsibilities of primary routing engine 22. However, any control plane packets waiting in the queue to be processed are often lost at the time of the failover. In addition, any received or transmitted packets en-route to or from primary routing engine 22 and FCs 34 are also typically lost. Therefore, in these cases, backup routing engine 24 may have little or no knowledge of the lost packets. The silent failover techniques employed by router 20 may prevent the termination of the network tunnel and the associated subscriber sessions even when queued or en-route packets are lost.

As another example, an additional time lag may be experienced between the failure of primary routing engine 22 and backup routing engine 24 becoming active. In other embodiments, router 20 may not include backup routing engine 24. If router 20 includes a primary routing engine capable of reinitializing quickly enough to avoid abnormal termination of the network tunnel, a time lag may exist between the primary routing engine failing and becoming active again. During the time lag neither primary routing engine 22 nor backup routing engine 24 are able to receive or send packets and acknowledgment messages. The invention provides techniques of preserving the network tunnel by handling the control plane packets lost during the failover when neither primary routing engine 22 nor backup routing engine 24 are active.

In some embodiments, in response to a failover event, backup routing engine 24 immediately issues failover notifications to ICs 32 indicating the failover event has occurred. In response to the notification, ICs 32 direct FCs 34 to send inbound control packets to ICs 32 instead of forwarding the inbound control packets to primary routing engine 22. As a result, when a non-failed router sends a control plane packet associated with the network tunnel, the receiving one of FCs 34 directs the control plane packet to the corresponding IC 32. In order to avoid abnormal termination of the network tunnel during the failover, response module 40 of the corresponding IC 32 sends an acknowledgment message to the non-failed router in response to the control plane packet with the sequence number expected by the peer. By acknowledging a received control packet, router 20 implicitly acknowledges receipt of any previously unacknowledged packets, which may include packets lost as a result of the failover. In that case, control packets that router 20 has not actually seen may be falsely acknowledged. Subscriber session database inconsistencies may result from the false acknowledgments, which are reconciled as described in further detail below.

After receiving the failover notification from backup routing engine 24, ICs 32 maintain journals 42 that record the network activity related to the network tunnel, such as subscriber session and network tunnel setup and tear down requests from the non-failed router as well as responses sent to the non-failed router by response modules 40. Journals 42 may assist router 20 in resolving subscriber session inconsistencies between routing database 26 and a routing database in the non-failed router when the failover is complete. ICs 32 record enough information in journals 42 about the received and transmitted messages to allow backup routing engine 24 to send disconnect messages to the non-failed router to synchronize the databases after the failover.

In some cases, the non-failed router may send subscriber session or network tunnel setup requests to router 20 during the failover. For example, in the case where the network tunnel is an L2TP tunnel, the non-failed router may send an Icrq packet, i.e., an attempt to establish a new subscriber session, or an Sccrq packet, i.e., an attempt to establish a new network tunnel. Upon receiving one of the above mentioned control packets, response modules 40 within ICs 32 may send a subscriber session or network tunnel disconnect request to the non-failed router. For example, response modules 40 may send a Cdn packet, i.e., an attempt to terminate a subscriber session, or a StopCcn packet, i.e., an attempt to terminate a network tunnel. The sequence numbers included with the disconnect request may be based on the sequence numbers included in the setup request from the non-failed router. If the non-failed router comprises a queue of received packets not yet processed, the lag may cause the disconnect request from router 20 to include duplicate sequence numbers. In that case, the disconnect request is discarded by the non-failed router and the non-failed router will think that the subscriber session or network tunnel is still attempting to connect to router 20 since the non-failed router has received neither a disconnect request nor the second packet in the three-way establishment handshake.

Once backup routing engine 24 becomes active and failover is complete, ICs 32 direct FCs 34 to send any subsequently received control packets to backup routing engine 24. ICs 32 also forward journals 42 to backup routing engine 24 for analysis and reconciliation of subscriber sessions stored in the respective routing databases maintained by router 20 and the peer router.

Database synchronization module 46 utilizes journals 42 to synchronize the subscriber sessions of routing database 26 at router 20 with the subscriber sessions of a routing database at the non-failed router. Specifically, database synchronization module 46 reviews journals 42 for network tunnel setup and tear down requests received from the non-failed router. Backup routing engine 24 then tears down any network tunnels created by the non-failed router during the failover and, therefore, not established at router 20. Backup routing engine 24, however, may tear down the network tunnels without informing the non-failed router due to the fact that the network tunnels may or may not have been successfully established prior to failover. Router 20 does not respond to any keep alive messages issued by the non-failed router for these network tunnels. Therefore, any network tunnels actually established during the failover will be silently terminated at the non-failed router. Similarly, any existing network tunnels that were terminated during the failover will be silently terminated at router 20 when the non-failed router does not respond to keep alive messages from router 20.

Database synchronization module 46 also uses journals 42 from ICs 32 to resolve subscriber session inconsistencies that result from the unavoidable loss of control plane packets during the failover. For example, a subscriber session may be established at the non-failed router and not established at router 20. In that case, router 20 may receive data traffic with one of FCs 34 on a non-established subscriber session. FC 34 informs the corresponding IC 32 of the received data traffic, which informs backup routing engine 24. Database synchronization module 46 then sends a subscriber session disconnect message to the non-failed router in response to the received data traffic. Consequently, although the individual subscriber session is torn down, the tunnel with which the subscriber session is associated is maintained, thereby avoiding tearing down and reestablishing other subscriber sessions associated with the tunnel.

As another example, a subscriber session may be established at router 20 during failover and not yet established at the non-failed router. In that case, router 20 listens for inbound data traffic on the subscriber sessions thought to be established for a period of time after the failover is complete. The monitoring period may be, for example, five minutes or any other configured time period. If one of FCs 34 receives data traffic during the monitoring period, database synchronization module 46 determines that the corresponding subscriber session has been correctly established at the non-failed router. If, however, none of FCs 34 receive data traffic during the monitoring period for a particular subscriber session, database synchronization module concludes that the subscriber session has not been established at the non-failed router. In that case, database synchronization module 46 sends a subscriber session disconnect message to ensure that the subscriber session has been terminated. In this fashion, database synchronization module 46 reconciles the respective routing databases maintained by router 20 and the peer router for the network tunnel. In some embodiments, a second monitoring period may be performed before sending the disconnect message.

Sequence number synchronization module 44 synchronizes the sequence numbers at router 20 with the sequence numbers at the non-failed router connected to router 20 for the network tunnel. Specifically, sequence number synchronization module 44 uses the mirrored sequence numbers stored in sequence number database 25 to determine the current sequence numbers for the network tunnels established at router 20. Sequence number synchronization module 44 recovers the last mirrored sequence numbers and generates a duplicate control plane packet with the recovered sequence numbers. Preferably, the duplicate control plane packet comprises a benign packet, such as a "hello packet," described in RFC 2661, which does not have any unintended side effects on the non-failed router and must be acknowledged by the non-failed router.

In some cases, sequence number synchronization module 44 may utilize sequence numbers for the duplicate control plane packet that are reduced from the mirrored sequence numbers by a set amount to ensure that the packet uses a sequence number already received by the peer device, i.e., that the packet is indeed a duplicate. For example, the sequence numbers of the duplicate control plane packet may be approximately 32 sequence numbers less than the recovered mirrored sequence numbers. Sequence number synchronization module 44 then sends the duplicate control plane packet to the non-failed router. The non-failed router typically responds to a duplicate control packet with the current sequence numbers at the non-failed router, as is required by RFC 2661. Based on the response, sequence number synchronization module 44 sets the sequence numbers at router 20 equal to the received sequence numbers from the non-failed router.

In this way, router 20 may maintain network connections during a failover of primary routing engine 22 and recover from the failover without knowledge or explicit support by the non-failed router. In the case where router 20 does not include backup routing engine 24, router 20 may include a primary routing engine capable of reinitializing and becoming active quickly enough to avoid abnormal termination of a network tunnel. Therefore, the primary routing engine may synchronize the sequence numbers and the subscriber sessions once the primary routing engine becomes active again.

Figure 3:
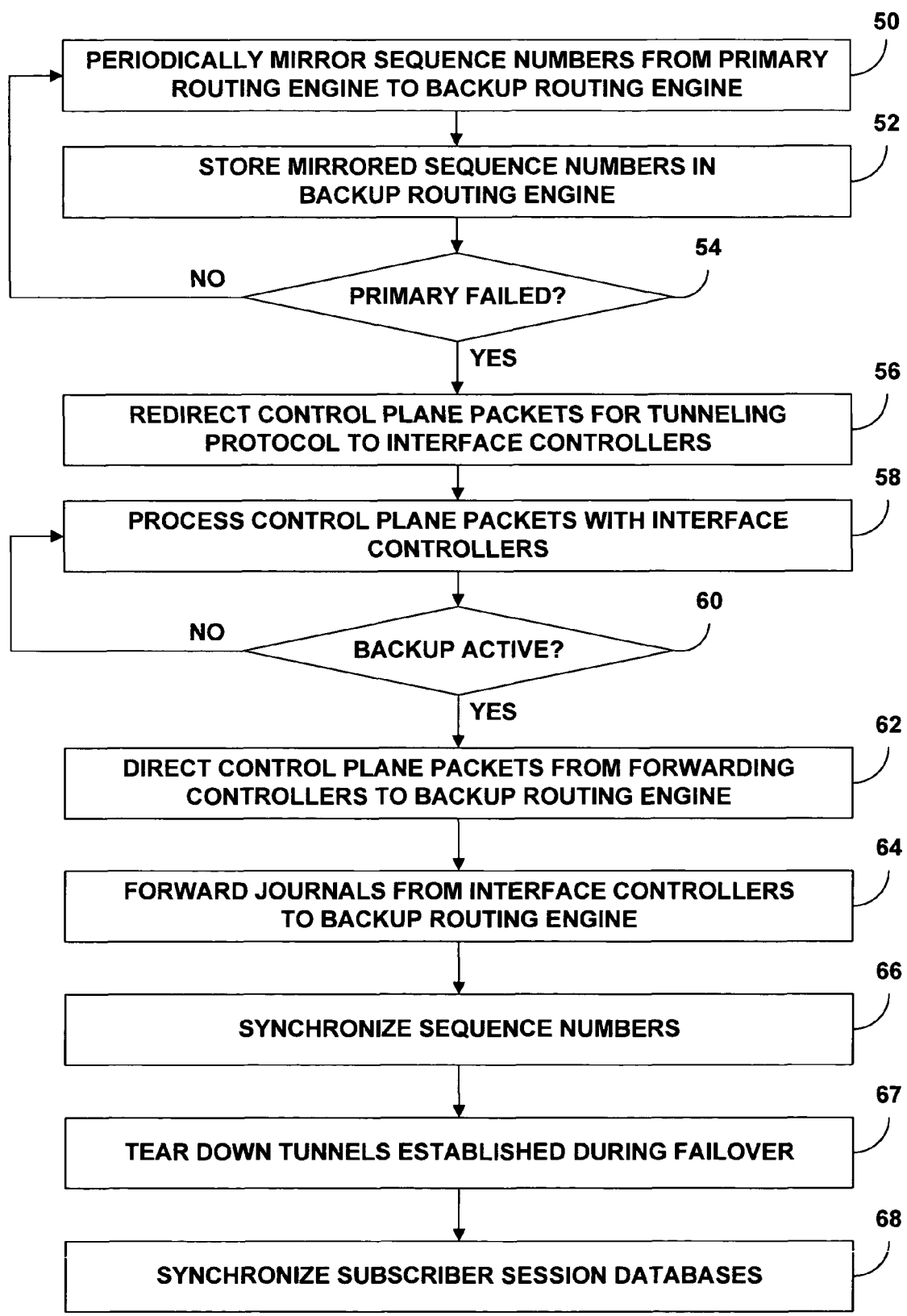
FIG. 3 is a flowchart illustrating an example operation of a router performing a silent failover.

FIG. 3 is a flowchart illustrating an example operation of a router performing a silent failover consistent with the techniques described herein. For exemplarily purposes, the flowchart is described in reference to router 20 from FIG. 2 communicates with a non-failed router to establish and maintain network tunnel, such as an L2TP tunnel associated with a plurality of subscriber sessions.

During normal operation, i.e., operation prior to a failover event, mirroring module 23 within primary routing engine 22 periodically mirrors sequence numbers from primary routing engine 22 to backup routing engine 24 (50). As described, mirroring module 23 may utilize a mirroring period that is a function of the number of sequence number changes, e.g., 256 sequence number changes. Mirroring module 23 may then store the mirrored sequence numbers in sequence number database 25 within backup routing engine 24 (52). Mirroring module 23 may also mirror control plane traffic and store the mirrored traffic in routing database 26 to maintain substantially similar routing information in both routing engines.

As long as primary routing engine 22 does not fail (no branch of 54), mirroring module 23 continues to mirror the control plane traffic and to periodically mirror the sequence numbers to backup routing engine 24 for storage (50, 52). In the event primary routing engine 22 fails (yes branch of 54), backup routing engine 24 issues failure notifications to ICs 32. In response, ICs 32 instruct FCs 34 to direct control plane packets associated with the tunneling protocol to the corresponding ICs instead of primary routing engine 22 (56). A time lag may be experienced between the failure of primary routing engine 22 and backup routing engine 24 becoming active. During the time lag neither primary routing engine 22 nor backup routing engine 24 may be able to receive or send packets and acknowledgment messages for the tunneling protocol. Therefore, ICs 32 locally process the control plane packets received by FCs 34 for the tunneling protocol during the failover (58). During the failover, ICs 32 process the control plane traffic for the tunneling protocol to avoid abnormal termination of the network tunnel between router 20 and the non-failed router, and record the control plane traffic for the tunneling protocol in journals 42.

While backup routing engine 24 is not yet active (no branch of 60), ICs 32 continue to process and record the control plane packets (58). When backup routing engine 24 becomes active (yes branch of 60), the backup routing engine instructs ICs 32 to direct the FCs to send the control plane packets associated with the tunneling to backup routing engine 24 and not to the ICs (62). ICs 32 then forward their respective journals 42 to backup routing engine 24 (64).

As described above, at the time of the failover, any control plane packets in primary routing engine 22 waiting to be processed may be lost, and any received or transmitted packets en-route to or from primary routing engine 22 and FCs 34 are lost. As a result, backup routing engine 24 typically has no knowledge of the lost packets and, therefore, has no knowledge of the sequence numbers associated with the lost packets.

Sequence number synchronization module 44 within backup routing engine 24 recovers the last mirrored sequence numbers from sequence number database 25. As further described below with respect to FIG. 5, sequence number synchronization module 44 uses the recovered sequence numbers to synchronize the sequence numbers at router 20 with the current sequence numbers at the non-failed router for the tunneling protocol (66).

Additionally, backup routing engine 24 reviews journals 42 and identifies any network tunnel setup and tear down requests received from the non-failed router during the failover from primary routing engine 24. Backup routing engine 24 then tears down any network tunnels created by the non-failed router during the failover, but not established at router 20 (67). Next, as described in further detail in reference to FIG. 6, database synchronization module 46 within backup routing engine 24 uses journals 42 to synchronize the subscriber sessions within the routing databases of router 20 and the non-failed router (68), for the network tunnels that were established prior to failover.

Figure 4:
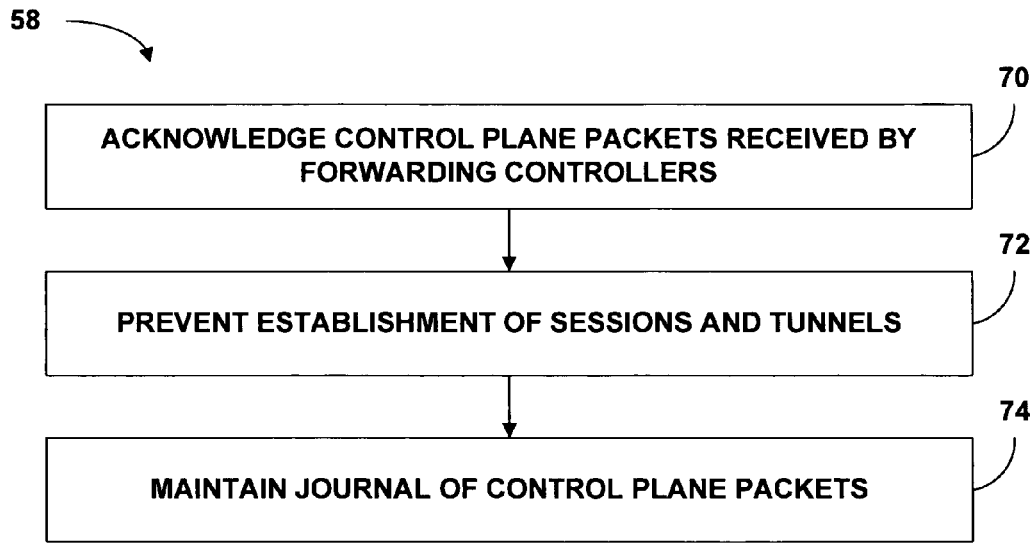
FIG. 4 is a flowchart illustrating an interface controller handling control plane packets during a silent failover in greater detail.

FIG. 4 is a flowchart illustrating exemplary operation of an interface controller when processing control plane packets during a silent failover (step 58 from FIG. 3) in greater detail. Specifically, FIG. 4 illustrates operation of the IFC, such as IFC 32A, when processing control plane packets after failover from primary routing engine 22 has been initiated. The interface controller may, for example, comprise any one of ICs 32 within router 20 from FIG. 2.

In order to avoid termination of the network tunnel during the failover, response modules 40 within ICs 32 automatically acknowledge the receipt of any control plane packets received from FCs 34 during the failover process (70). As described above, the failure to issue acknowledgements during failover to the non-failed router will terminate the entire network tunnel, including all the subscriber sessions established within the tunnel. By acknowledging received control packet while backup routing engine assumes the role of the primary routing engine, ICs 32 implicitly acknowledge receipt of any previously unacknowledged packets, which may include packets lost as a result of the failover.

ICs 32 also prevents establishment of new subscriber sessions or network tunnels during the failover (72). In the case where the non-failed router sends subscriber session or network tunnel setup requests to router 20, response modules 40 may send a subscriber session or network tunnel disconnect request to the non-failed router. The sequence numbers included with the disconnect request may be based on the sequence numbers included in the setup request from the non-failed router. In some cases, however, the non-failed router comprises a queue of received packets not yet processed, the lag may cause the disconnect request from router 20 to include duplicate sequence numbers. In that case, the disconnect request is discarded by the non-failed router, and the non-failed router may believe that the subscriber session or network tunnel is still attempting to connect to router 20. This situation is handled during the reconciliation process, which is described in further detail below.

In addition, ICs 32 maintain journals 42 of network activity during the failover period that relates to the tunneling protocol (74). For example, ICs 32 may record subscriber session and network tunnel setup and tear down requests from the non-failed router as well as responses sent to the non-failed router by response modules 40. Journals 42 assist backup routing engine 24 in resolving subscriber session inconsistencies between routing database 26 in router 20 and a routing database in the non-failed router after the failover is complete. ICs 32 record enough information in journals 42 about the received and transmitted messages so that backup routing engine 24 is able to send disconnect messages to the non-failed router to synchronize the subscriber sessions after the failover.

Figure 5:
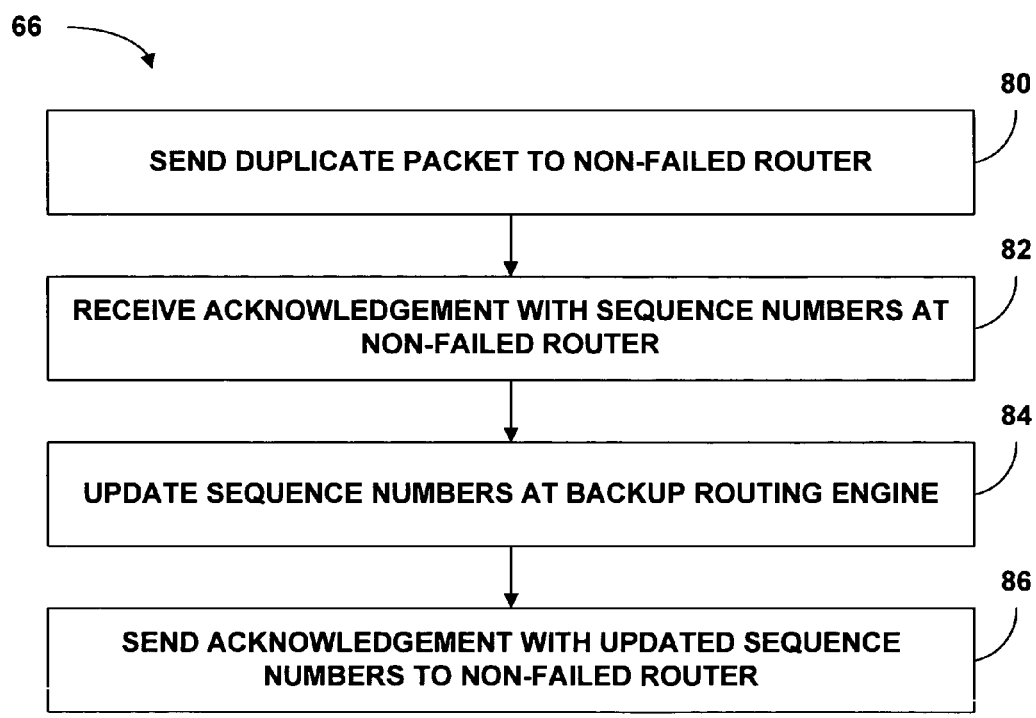
FIG. 5 is a flowchart illustrating the synchronization of sequence numbers after a silent failover in greater detail.

FIG. 5 is a flowchart illustrating in further detail the synchronization of sequence numbers by backup routing engine 24 after a silent failover from failed primary routing engine 22 (step 66 from FIG. 3).

Sequence number synchronization module 44 sends a duplicate control plane packet to the non-failed router to synchronize the sequence numbers with the non-failed router for the tunneling protocol (80). Preferably, the duplicate control plane packet comprises a benign packet, such as a Hello packet, described in RFC 2661, which does not have any unintended side effects on the non-failed router and must be acknowledged by the non-failed router. The control plane packet is a duplicate in the sense that the sequence numbers used within the duplicate packet have been utilized in a packet previously sent to the non-failed router. As described, sequence number synchronization module 44 uses the mirrored sequence numbers stored in sequence number database 25 for selecting the sequence numbers to be used in the duplicate control plane packet. Specifically, sequence number synchronization module 44 recovers the last mirrored sequence numbers and generates the duplicate control plane packet with the recovered sequence numbers. In some cases, the recovered sequence numbers may be reduced by a set amount of sequence numbers to ensure that the packet is a duplicate. For example, the sequence numbers of the duplicate control plane packet may be approximately 32 sequence numbers less than the recovered mirrored sequence numbers.

Router 20 receives an acknowledgement to the duplicate control plane packet that contains the current sequence numbers maintained by the non-failed router (82). Sequence number synchronization module 44 then sets the current sequence numbers at backup routing engine 24 equal to the received sequence numbers from the non-failed router (84). Sequence number synchronization module 44 then sends an acknowledgment with the updated sequence numbers to the non-failed router (86).

Figure 6A:
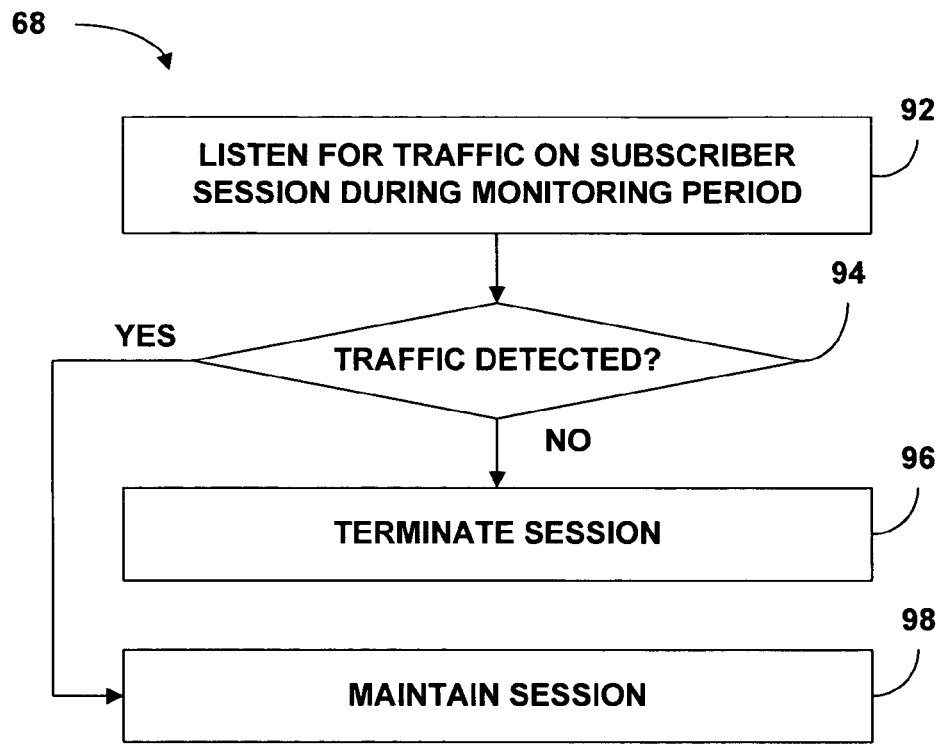
FIGS. 6A and 6B are flowcharts illustrating in greater detail the synchronization of subscriber session databases after a silent failover.
Figure 6B:
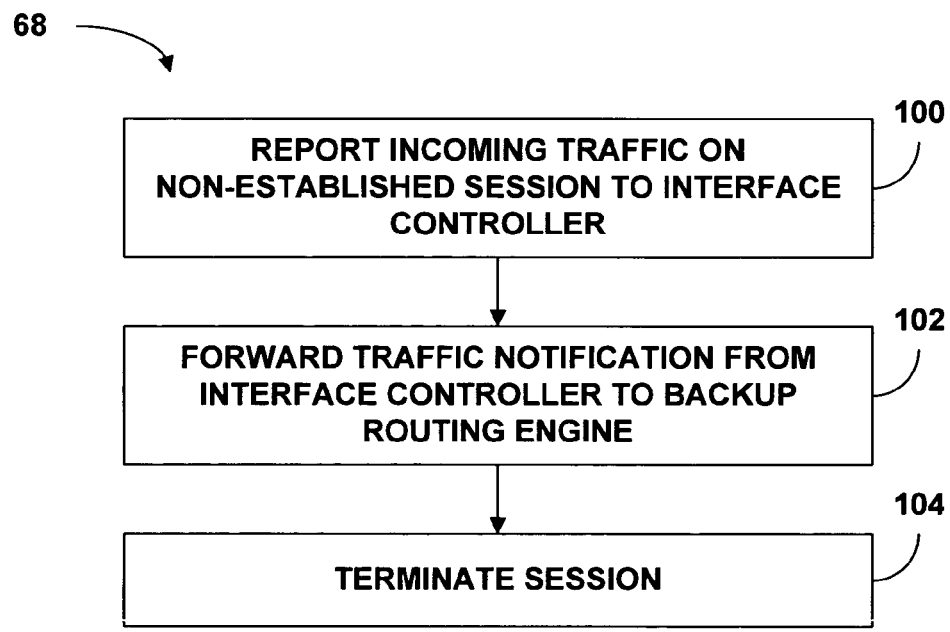

FIGS. 6A and 6B are flowcharts illustrating in further detail the synchronization of subscriber sessions of a routing database within a router after a silent failover (step 68 from FIG. 3). After receiving journals 42 from ICs 32, database synchronization module 46 of backup routing engine 22 the database synchronization module uses the journals to resolve any subscriber session inconsistencies that result from the unavoidable loss of control plane packets during the failover. FIG. 6A illustrates operation of router 20 after failover to reconcile the subscriber sessions that the router believes to have been fully established prior to failover. FIG. 6B illustrates operation of router 20 after failover to tear down any other subscriber sessions for which only the non-failing router believes have been established.

Referring to FIG. 6A, router 20 monitors each subscriber session specified in routing database 26 and, in particular, listens for inbound data traffic on the subscriber session for a period of time after the failover is complete (92). The monitoring period may be configured to any period of time for which traffic would reasonably be expected, e.g., five minutes. If any one of FCs 34 receives data traffic during the monitoring period (yes branch of 94) for a given subscriber session, database synchronization module 46 concludes that the subscriber session was fully established and maintains the subscriber session with the non-failed router (98). If none of FCs 34 receive data traffic during the monitoring period (no branch of 94), database synchronization module 46 determines that the subscriber session was not established at the non-failed router prior to or during failover. Database synchronization module 46 then sends a subscriber session disconnect message to terminate the subscriber session (96). In some embodiments, a second monitoring period may be performed before terminating the subscriber session to avoid erroneous termination.

Referring to FIG. 6B, after failover router 20 may receive data traffic with one of FCs 34 for a subscriber session not specified within routing database 26. In that case, the receiving one of FCs 34 reports the incoming data traffic and the non-established session to the corresponding one of ICs 32 (100). The one of ICs 32 then forwards the data traffic notification to backup routing engine 24 (102). Database synchronization module 46 then sends a subscriber session disconnect message to the non-failed router to terminate the subscriber session (104). Although the individual subscriber session is terminated, the techniques avoid tearing down the network tunnel, which result in disconnection of all of the associated subscribers sessions.

Moreover, the techniques may be applied to a variety of network devices, access devices, enterprise devices, edge devices or core devices. Further, the devices may implement layer two functionality, layer three functionality or combinations thereof. For exemplary purposes, the techniques are described above in reference to a network router that may support L2TP and may operate as either a LAC or LNS.

Various embodiments of the invention have been described. However, one skilled in the art will appreciate that various modifications or additions may be made to the described embodiments without departing from the scope of the claimed invention. For example, although described in the context of L2TP, the invention may be applicable to a variety of other protocols that utilize reliable sequence numbering. Such protocols often include a benign packet and an ability to acknowledge duplicate control plane packets, which may be utilized in order to recover sequence numbers. These and other embodiments are within the scope of the following claims.

The invention claimed is:

1. A method comprising:
   establishing a network tunnel between a first device and a second device, wherein the first device includes a primary control unit and a backup control unit;
   mirroring sequence numbers at the primary control unit of the first device before a failover from the primary control unit to the backup control unit of the first device;
   failing over to the backup control unit in response to a failure of the primary control unit;
   directing packets received by a forwarding controller of an interface card of the first device to an interface controller of the interface card during the failover and prior to the backup control unit becoming active as a master control unit for the first device;
   with the interface controller, maintaining the network tunnel between the first device and the second device throughout the failover by acknowledging receipt of the packets received from the second device during the failover;
   when the failover is complete, sending a duplicate control plane packet from the backup control unit to the second device to elicit a response from the second device having current sequence numbers at the second device to allow the backup control unit to synchronize sequence numbers at the first device with sequence numbers at the second device, wherein the duplicate control plane packet is a duplicate of a control plane packet previously sent by the first network device;
   identifying one or more subscriber sessions associated with the network tunnel as not having been established at one of the first device and the second device when the failover is complete; and
   when the failover is complete, terminating with the backup control unit the identified one or more subscriber sessions associated with the network tunnel to synchronize subscriber sessions associated with the network tunnel at the first device with subscriber sessions associated with the network tunnel at the second device.

2. The method of claim 1, further comprising failing over to the backup control unit and maintaining the network tunnel without notifying the second device of the failover.

3. The method of claim 1, further comprising storing the mirrored sequence numbers in the backup control unit associated with the first device.

4. The method of claim 1, further comprising receiving a failover notification with the interface controller when the first device initiates the failover of the primary control unit.

5. The method of claim 1, further comprising maintaining a journal of network activity with the interface controller during the failover.

6. The method of claim 5, further comprising forwarding the journal to the backup control unit associated with the first device when the failover is complete.

7. The method of claim 1, further comprising preventing establishment of subscriber sessions and network tunnels with the interface controller during the failover.

8. The method of claim 1, further comprising directing the received packets to the backup control unit associated with the first device when the failover is complete.

9. The method of claim 1, further comprising recovering the mirrored sequence numbers from the first device, wherein the duplicate control plane packet includes sequence numbers less than the recovered mirrored sequence numbers.

10. The method of claim 1, further comprising receiving an acknowledgment of the duplicate control plane packet from the second device, wherein the acknowledgment includes sequence numbers at the second device.

11. The method of claim 10, further comprising updating the sequence numbers at the first device to be approximately equal to the received sequence numbers.

12. The method of claim 1, further comprising terminating network tunnels not established at one of the first device and the second device when the failover is complete.

13. A non-transitory computer-readable medium comprising instructions that when executed cause a first device to:
   establish a network tunnel between the first device and a second device, wherein the first device includes a primary control unit and a backup control unit;
   periodically mirror sequence numbers at the primary control unit before a failover from the primary control unit to the backup control unit;
   failover to the backup control unit in response to a failure of the primary control unit;
   direct packets received by a forwarding controller of the first device to an interface controller of the first device during the failover when the first device initiates the failover of the primary control unit;
   maintain the network tunnel throughout the failover;
   maintain the network tunnel between the first device and the second device during the failover by acknowledging receipt of packets from the second device;
   send a duplicate control plane packet to the second device when the failover is complete to elicit a response from the second device having the current sequence numbers at the second device to allow the backup control unit to synchronize sequence numbers at the first device with sequence numbers at the second device, wherein the duplicate control plane packet is a duplicate of a control plane packet previously sent by the first network device;
   identify one or more subscriber sessions associated with the network tunnel as not having been established at one of the first device and the second device when the failover is complete; and
   terminate the identified one or more subscriber sessions when the failover is complete to synchronize subscriber sessions at the first device with subscriber sessions at the second device.

14. A first network device comprising:
   a primary control unit that establishes a network tunnel with a second network device;
   a backup control unit that maintains the network tunnel in response to a failure of the primary control unit, wherein the primary control unit includes a mirroring module to mirror sequence numbers to the backup control unit before the failover;

a forwarding controller to direct packets associated with the network tunnel to an interface controller during the failover from the primary control unit to the backup control unit;

a response module to acknowledge receipt of packets from the second device during the failover; and a sequence number synchronization module to send a duplicate control plane packet to the second device when the failover is complete to elicit a response from the second device having the current sequence numbers at the second device to allow the backup control unit to synchronize sequence numbers at the first device with sequence numbers at the second device, wherein the duplicate control plane packet is a duplicate of a control plane packet previously sent by the first network device.

15. The device of claim 14, wherein the response module of the interface controller detects requests to establish subscriber sessions or network tunnels and identifies one or more subscriber sessions or network tunnels associated with the network tunnel as not having been established at one of the first device and the second device when the failover is complete, and in response issues disconnect requests to prevent the establishment of the identified subscriber sessions or network tunnels during the failover from the primary control unit to the backup control unit.

16. The device of claim 14, wherein the backup control unit issues a failover notification to the interface controller to indicate the initiation of the failover.

17. The device of claim 14, wherein the interface controller maintains a journal to record network activity associated with the network tunnel during the failover.

18. The device of claim 17, wherein the interface controller forwards the journal to the backup control unit when the failover to the backup control unit is complete.

19. The device of claim 14, wherein the forwarding controller directs the received control plane packets to the backup control unit when the failover is complete.

20. The device of claim 14, wherein the packets comprise control plane packets.

21. The device of claim 14,
wherein the backup control unit comprises a mirrored database that stores sequence numbers mirrored from the primary control unit, and
wherein the sequence number synchronization module recovers the mirrored sequence numbers from the first router, and generates the duplicate control plane packet to include sequence numbers less than the recovered mirrored sequence numbers.

22. The device of claim 14,
wherein the sequence number synchronization module receives an acknowledgment of the duplicate control plane packet from the second network device that includes sequence numbers at the second device, and
wherein the sequence number synchronization module updates the sequence numbers at the first device to be approximately equal to the received sequence numbers.

23. The device of claim 14, further comprising a database synchronization module to synchronize subscriber sessions stored in a routing database of the backup control unit with subscriber sessions of another routing database at the second network device after failover.

24. The device of claim 14, wherein the network tunnel comprises a Layer 2 Tunneling Protocol (L2TP) tunnel, and the first device comprises an L2TP Access Concentrator (LAC) or an L2TP Network Server (LNS).

25. A method comprising:
receiving with an interface of a first network device a failover notification indicating initiation of a failover of a primary control unit of the first network device to a backup control unit of the first network device;

maintaining a network tunnel between the first network device and a second network device during the failover;

redirecting packets received by a forwarding controller of the interface to an interface controller of the interface in response to the failover notification instead of directing the packets to the primary control unit;

with the interface controller of the interface, maintaining a journal of network activity associated with the network tunnel during the failover based on the packets redirected to the interface controller;

forwarding the journal from the interface controller of the interface to the backup control unit when the failover is complete;

when the failover is complete, sending a duplicate control plane packet from the backup control unit to the second network device to elicit a response from the second network device having current sequence numbers at the second network device to allow the backup control unit to synchronize sequence numbers at the first network device with sequence numbers at the second network device, wherein the duplicate control plane packet is a duplicate of a control plane packet previously sent by the first network device;

based on the forwarded journal, identifying one or more subscriber sessions associated with the network tunnel as not having been established at one of the first network device and the second network device when the failover is complete; and when the failover is complete, terminating with the backup control unit the identified one or more subscriber sessions associated with the network tunnel to synchronize subscriber sessions associated with the network tunnel at the first network device with subscriber sessions associated with the network tunnel at the second network device.

26. The method of claim 25, wherein the network activity comprises setup and tear down requests for subscriber sessions or additional network tunnels.

27. The method of claim 25, further comprising directing the received packets to the backup control unit when the backup control unit becomes active.

28. The method of claim 25, further comprising:
detecting with the interface controller requests to establish subscriber sessions or network tunnels during the failover; and
issuing disconnect requests in response to the requests to establish subscriber sessions or network tunnels to prevent the establishment of subscriber sessions or network tunnels during the failover from the primary control unit to the backup control unit.

29. The method of claim 25, wherein the first network device comprises a router, the primary control unit comprises a primary routing engine and the backup control unit comprises a backup routing engine.

30. The method of claim 25, wherein the first network device comprises a Layer 2 Tunneling Protocol (L2TP) Access Concentrator (LAC) or an L2TP Network Server (LNS).

31. A non-transitory computer-readable medium comprising instructions that when executed cause an interface of a first network device to:

receive a failover notification indicating initiation of a failover of a primary control unit of the first network device to a backup control unit of the first network device;

maintain a network tunnel between the network device and second network device during the failover;

redirect packets received by a forwarding controller of the interface to an interface controller of the interface in response to the failover notification instead of directing the packets to the primary control unit;

maintain a journal of network activity associated with the network tunnel during the failover based on the packets redirected to the interface controller;

forward the journal from the interface controller of the interface to the backup control unit when the failover is complete;

when the failover is complete, send a duplicate control plane packet from the backup control unit to the second network device to elicit a response from the second network device having current sequence numbers at the second device to allow the backup control unit to synchronize sequence numbers at the first network device with sequence numbers at the second network device, wherein the duplicate control plane packet is a duplicate of a control plane packet previously sent by the first network device;

based on the forwarded journal, identify one or more subscriber sessions associated with the network tunnel as not having been established at one of the first network device and the second network device when the failover is complete; and when the failover is complete, terminate with the backup control unit the identified one or more subscriber sessions associated with the network tunnel to synchronize subscriber sessions associated with the network tunnel at the first network device with subscriber sessions associated with the network tunnel at the second network device.

32. A network device comprising:

an interface having an interface controller;

a primary control unit;

a backup control unit to issue a failover notification when the network device initiates a failover of the primary control unit to the backup control unit;

a forwarding controller of the interface that directs control plane packets to the primary control unit prior to the failover notification, and directs control plane packets to the interface controller in response to the failover notification instead of directing the packets to the primary control unit, wherein the interface controller comprises:

a response module to maintain a network tunnel between the network device and second network device during the failover; and a journal in which the interface controller records network activity during the failover based on the control plane packets redirected to the interface controller, wherein the interface controller forwards the journal to the backup control unit when the failover is complete, wherein when the failover is complete, the backup control unit sends a duplicate control plane packet to the second device to elicit a response from the second device having current sequence numbers at the second device to allow the backup control unit to synchronize sequence numbers at the network device with sequence numbers at the second device, wherein the duplicate control plane packet is a duplicate of a control plane packet previously sent by the network device; and a database synchronization module that, based on the forwarded journal, identifies one or more subscriber sessions associated with the network tunnel as not having been established at one of the network device and the second network device when the failover is complete, and wherein when the failover is complete, the backup control unit terminates the identified one or more subscriber sessions associated with the network tunnel to synchronize subscriber sessions associated with the network tunnel at the network device with subscriber sessions associated with the network tunnel at the second network device.

33. The network device of claim 32, wherein the network tunnel comprises a Layer 2 Tunneling Protocol (L2TP) tunnel.

34. The network device of claim 32, wherein the network activity comprises setup and tear down requests for subscriber sessions and network tunnels.

35. The network device of claim 32, wherein the network device comprises one of a Layer 2 Tunneling Protocol (L2TP) Access Concentrator (LAC) or an L2TP Network Server (LNS).

36. A method comprising:

accessing a subscriber database of a backup control unit to identify subscriber sessions associated with a network tunnel upon failover to the backup control unit from a primary control unit;

monitoring for data packets on the identified subscriber sessions for a time interval;

terminating any of the subscriber sessions for which no data packets were received during the time interval;

updating the subscriber database within the backup control unit to remove the terminated subscriber sessions;

detecting data packets associated with a subscriber session not specified within the subscriber database; and terminating the subscriber session with the backup control unit in response to the detected packets.

37. The method of claim 36, wherein the network tunnel comprises a Layer 2 Tunneling Protocol (L2TP) tunnel, and the network device comprises an L2TP Access Concentrator (LAC) or an L2TP Network Server (LNS).

38. A network device comprising:

a primary control unit;

a backup control unit having a subscriber database; and a database synchronization module that accesses the subscriber database to identify subscriber sessions associated with a network tunnel upon failover to the backup control unit from the primary control unit, terminates any of the subscriber sessions for which no data packets are received during a time interval, updates the subscriber database within the backup control unit to remove the terminated subscriber sessions, detects data packets associated with a subscriber session not specified within the subscriber database, and terminates the subscriber session with the backup control unit in response to the detected packets.

39. The device of claim 38, wherein the network tunnel comprises a Layer 2 Tunneling Protocol (L2TP) tunnel, and the network device comprises an L2TP Access Concentrator (LAC) or an L2TP Network Server (LNS).

* * * * *